United States Patent [19]

Pearson

[11] 4,296,406
[45] Oct. 20, 1981

[54] PRESSURE SENSITIVE SWITCH STRUCTURE

[75] Inventor: Billy J. Pearson, Bluff City, Tenn.

[73] Assignee: Sperry Corporation, New York, N.Y.

[21] Appl. No.: 107,970

[22] Filed: Dec. 28, 1979

[51] Int. Cl.³ .............................................. G08C 21/00
[52] U.S. Cl. .............................. 340/166 R; 340/365 A; 178/18
[58] Field of Search ......... 178/18; 340/365 R, 365 E, 340/365 S, 166 R, 365 A

[56] References Cited

U.S. PATENT DOCUMENTS

| | | | |
|---|---|---|---|
| 4,013,835 | 3/1977 | Eachus et al. | 340/365 A |
| 4,158,117 | 6/1979 | Quilliam et al. | 340/365 A |
| 4,198,539 | 4/1980 | Pepper, Jr. | 178/18 |
| 4,199,751 | 4/1980 | Piquet | 340/365 A |

Primary Examiner—Donald J. Yusko
Attorney, Agent, or Firm—John B. Sowell; William E. Cleaver; Marshall M. Truex

[57] ABSTRACT

The present invention switch comprises a pair of electrodes separated by resilient resistive material which changes resistance several orders of magnitude in response to light pressure. Sensing and amplifying means are provided to detect a predetermined change in resistance. An array of a plurality of such switches may be arranged in a switching matrix to provide any desired form of switch controls or a keyboard for numerous electronic applications.

6 Claims, 11 Drawing Figures

U.S. Patent   Oct. 20, 1981   Sheet 1 of 3   4,296,406
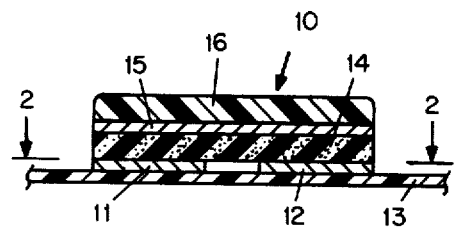
FIGURE 1
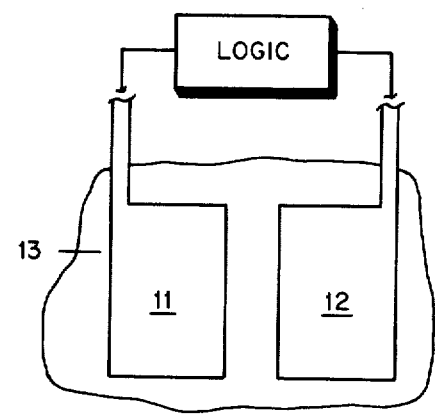
FIGURE 2
FIGURE 3
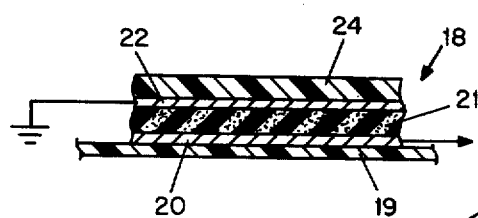
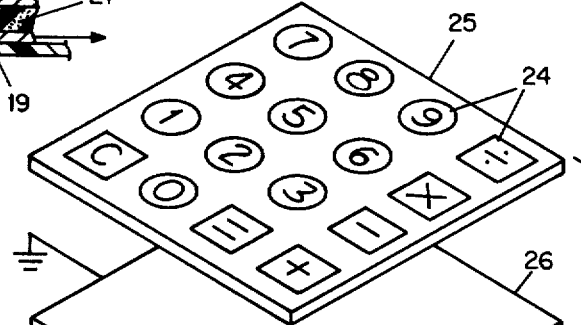
FIGURE 5
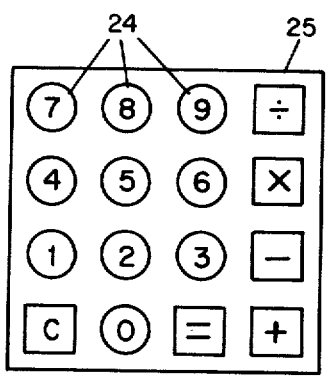
FIGURE 4
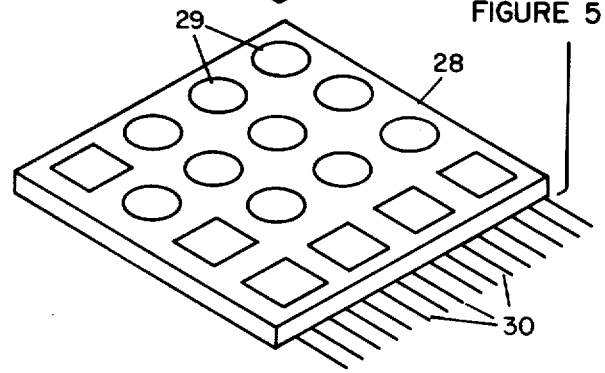

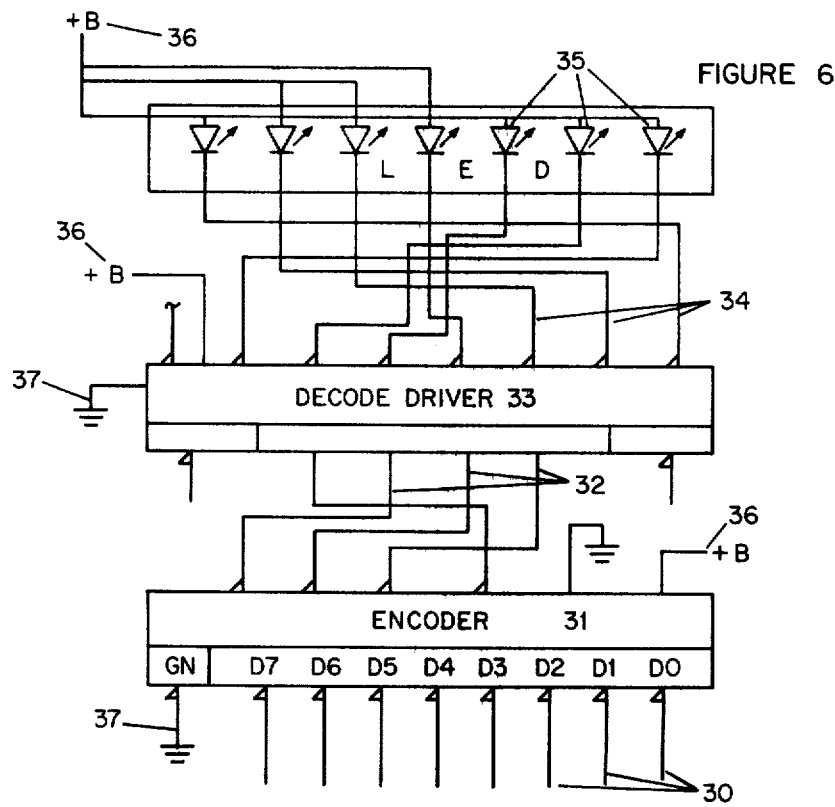
FIGURE 6
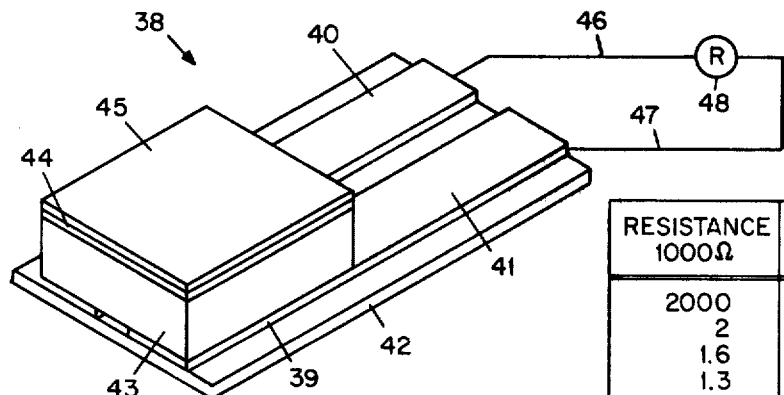
FIGURE 7
| RESISTANCE 1000Ω | PRESS LBS. |
|---|---|
| 2000 | 0 |
| 2 | 1.0 |
| 1.6 | 2.0 |
| 1.3 | 2.5 |
| 1.0 | 3.0 |
| .950 | 3.5 |
| .730 | 4.0 |
| .560 | 4.5 |
| .500 | 5.0 |
FIGURE 8

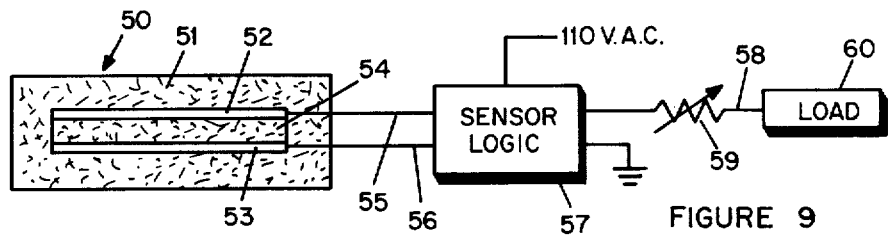
FIGURE 9
| PRESSURE GRAMS | RESISTANCE 1000Ω |
|---|---|
| 10 | 95 |
| 50 | 60 |
| 100 | 21 |
| 200 | 6.8 |
| 500 | 2.5 |
| 1000 | .900 |
| 20LBS | .035 |
FIGURE 10
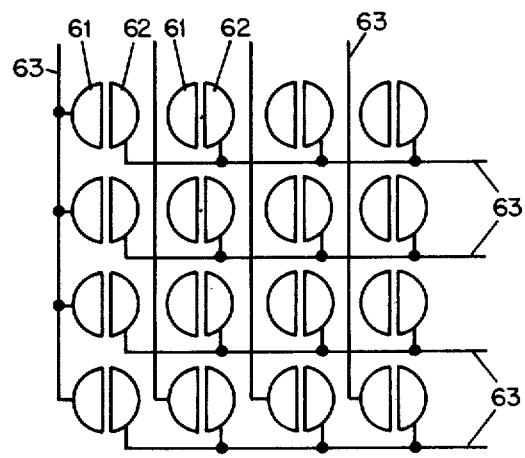
FIGURE 11

PRESSURE SENSITIVE SWITCH STRUCTURE

BACKGROUND OF THE INVENTION

1. Field of the Invention

The present invention relates to variable resistance devices and more particularly to an improved switch of the type used for keyboard switching arrays.

2. Description of the Prior Art

Carbon pile resistors which comprise a plurality of rigid carbon buttons or disks have been employed as variable resistance elements. Such disks have been arranged in a stack between terminals in a series circuit. These variable resistance elements employ the application of a relatively large pressure to the stack of carbon disks to vary the surface resistance between the disk and thus between the terminals. The range of resistance of carbon pile resistors is limited and the carbon disks require substantial pressures to obtain desired resistance variations. The required pressure is supplied through devices such as screws or other force enhancing mechanisms. Carbon pile resistance elements are not practical for use where a light finger pressure is the actuating force, thus, have not been known to be employed in switches.

Miniature touch control switches and touch control panels are known. Such prior art touch control devices sense the closing of a circuit or the change of capacitance resulting from the touching of a switch element. The presence or absence of the finger may be sensed through a scanning device or may be sensed as a change in capacitance of an associated circuit when touched by a finger. Scanning devices usually employ a light intercept principal which requires complex sensing and logic circuitry. Capacitative sensing devices also employ relatively complex circuitry as well as requirement for continuous electrical current.

Membrane switches differ from the present invention. In one form of membrane switch two electrically conductive elements are separated by a very thin dielectric insulating separator having an aperture therein. The two electrically conductive elements, usually in flexible sheet form, are physically connected through the aperture by the application of pressure to one of the sheets. The problem with such switches is that surface resistance of the sheets and/or distortion of the sheets changes the resistance appreciably.

Capacitive touch switches employ a more complex structure. Two or more capacitors are arranged in a series circuit. Each capacitor has its plates separated from each other by a dielectric insulator. The capacitors are arranged in a logic circuit so that a current from a clock signal is applied as an input to one side of the capacitor and sensed at the other side as an output level. When the mutual or common plate of the capacitors is touched, the output signal therethrough is effectively grounded, thus, no signal is raised on the output line. The lack of a signal is employed in the logic circuits to detect a touch of the switch. The problem with such switches is that grounds and other malfunctions are detected as a touch signal. Such circuits always draw current even though not in use.

It would be desirable to provide a switch for use in electronic circuits which has no contacts to wear or change resistance through oxidation. Further, it would be desirable to provide a switch which operates similar to a touch switch and/or can be made to respond to a predetermined force or a predetermined displacement.

SUMMARY OF THE INVENTION

It is a principal object of the present invention to provide a novel pressure sensitive switch structure for use in electrical apparatus and electronic systems.

It is another object of the present invention to provide an extremely reliable and durable switch structure which is inexpensive to produce.

It is another object of the present invention to provide a novel pressure sensitive switch structure capable of producing an analog signal output proportional to pressure or distance displacement input.

It is another object of the present invention to provide a novel displacement sensitive electrical apparatus capable of producing a variable voltage output.

It is yet another object of the present invention to present a novel switch structure which provides a plurality of individual switches of the type employed in control panels or keyboards.

It is yet another object of the present invention to provide a novel pressure sensor device.

In accordance with these and other objects of the present invention there is provided a pressure sensitive indicating device having two conductive electrodes adapted to be connected to a source of current, said conductive electrodes having a resilient-conductive-resistive material connected therebetween, said conductive-resistive material displaying the characteristic of being compressible into a substantially smaller volume or space in response to an application of a compressive force and further displaying the characteristic of decreasing in electrical resistance when in said compressed state, whereby the application of a compressive force to said conductive-resistive material is effective to switch the current flow between said conductive electrodes.

BRIEF DESCRIPTION OF THE DRAWINGS

The foregoing objects and advantages of the novel switch and its mode of operation will be made apparent from the detailed description of the accompanying drawings in which:

FIG. 1 is an evaluation in section taken through a preferred embodiment push-button switch;

FIG. 2 is a plan view of the conductive elements taken at section 22 in FIG. 1;

FIG. 3 is a section in elevation of another preferred embodiment switch according to the present invention;

FIG. 4 is a plan view of the preferred embodiment keyboard of the type which may incorporate the novel switches shown in FIGS. 1 to 3;

FIG. 5 is an exploded isometric view of a typical keyboard switch embodying the principals of the switch shown in FIG. 3;

FIG. 6 is an electrical schematic drawing showing electrical circuitry of the type which may be employed with the keyboard switch of the type shown in FIGS. 4 and 5;

FIG. 7 is a modified embodiment of the switch shown in FIG. 1 of a type which may be employed to sense either movement, distance or pressure;

FIG. 8 is a chart showing ohms resistance vs. pressure applied to the pressure sensitive switch of the type shown in FIG. 7;

FIG. 9 is a further modified embodiment of the switch shown in FIG. 7 illustrating its use in a footpedal switch employed to control a light motor load;

FIG. 10 is a chart showing the resistance vs. light pressure applied to the switches of the type shown in FIGS. 3 to 5;

FIG. 11 is a plan view showing the conductive pads arranged in a matrix array which may be employed in switches of the type shown in FIG. 1.

DESCRIPTION OF THE PREFERRED EMBODIMENT

FIG. 1 is a partial section in elevation taken through a typical preferred embodiment push-button switch. The switch device 10 comprises a first conductive pad or layer 12. The pads 11 and 12 are mounted on a typical or well known printed circuit board 13 forming an insulator therefore. The pads 11 and 12, as will be explained hereinafter, may be etched foil printed circuits having a conductive-resistive material which displays a low resistance when little or light pressure is applied and displays a very high resistance when no pressure is applied. The conductive-resistive material 14 overlies both pads 11 and 12. Overlying the conductive-resistive material 14 is a layer of conductive material such as copper foil 15 which may be attached to the push-button 16 comprising an insulative material.

The conductive-resistive material is preferrably a plastic which is impregnated with carbon black or a conductive carbon and is non-corrosive to prevent deposits on or oxidation of the copper foil material 11, 12 and 15. Such a material is available from Minnesota Mining and Manufacturing Company (3M Company) under trade name of VELOSTAT (TM). VELOSTAT material may be purchased in the form of plastic sheet approximately 4 mils thick designated as VELOSTAT (TM) type 1704 which is an ethylene vinyl acetate (EVA) modified polyethylene with carbon black filler. As will be explained hereinafter VELOSTAT in the form of foam may be purchased from 3M Company which is designated as a type 2900 series sheet or roll. Such VELOSTAT (TM) foam comprises a polyetherurethane impregnated with carbon black.

When a light finger pressure is applied to push-button 16 the conductive-resistive material 14 overlying the conductive pads 11 and 12 is compressed so that the resistance drops from approximately 2 meg ohms down to less than approximately 800 ohms with the application of only two ounces of finger pressure. As shown in FIG. 2 the pads 11 and 12 may be connected to an electrical circuit to perform logical functions. It will be understood that the logic is capable of sensing the change from 2 meg ohms to approximately 800 ohms as will be explained in detail hereinafter.

Referring now to FIG. 3 there is shown a modified preferred embodiment switch 18 comprising a printed circuit board 19 having thereon a conductive foil pad 20, a layer of conductive-resistive material 21 and a second conductive pad 22; and overlying the preceeding elements a flexible insulator sheet which comprises a push-button area 24. The push-button areas 24 may be formed as printed indicia on an insulative mylar sheet 25 as shown in FIG. 4.

Refer now to FIGS. 4 and 5 showing in exploded view a plurality of switches of the type shown in FIG. 3 and forming a keyboard or matrix of switches. The push-button areas 24 may be printed directly on a flexible mylar sheet 25 which overlies a flexible conductive foil plane 26 similar to the flexible foil 22 shown in FIG. 3. Beneath the conductive foil 26 there is provided a sheet of conductive-resistive material of the type hereinbefore described. In the preferred embodiment shown in FIG. 5, a 4 mil thickness VELOSTAT (TM) sheet was employed in the illustrated keyboard array. Printed circuit board 28 was provided with a plurality of etched foil conductive pads 29 aligned directly below the push-button areas 24. Each of the conductive pads 29 was provided with an individual lead 30 connected thereto. As explained hereinbefore, it will be understood that the depression of any one of the push-button areas 24 with a light finger pressure causes the resistance between the ground plane 26 and the etched foil areas 29 to be reduced from a very high resistance value to a low resistance value which may be sensed on lines 30.

Refer now to FIG. 6 showing a logic circuit of the type which may be connected to the leads 30 from the switch matrix of FIG. 5. When one of the push-buttons 23 shown in FIG. 5 were depressed with a light finger pressure the sensory systems on line 30 for the individual push-button switch dropped from a high value to a low a value and this low value may be sensed on leads 30 shown in FIGS. 5 and 6. In FIG. 6, the open flag on lines 30 show that a low value will activate the individual leads to the encoder 31 and generate an active low value on leads 32 as a binary coded decimal output. The binary coded decimal output on leads 32 is shown applied as an active low value to decoder-driver 33 which in turn generates a low value output at one of the plurality of leads 34 connected to an individual light emitting diode (LED) 35 causing the light emitting diodes 35 to be activated. The light emitting diodes may be seven segment diodes available from numerous manufacturers. The illustrated decoder driver 33 may be a TTL SN 7447 decoder driver available from numerous manufacturers. The encoder 31 may be a TTL encoder Part 74148 available from numerous manufacturers. The logic circuit blocks are supplied with a B+ voltage of approximately 5 volts d.c. at terminal 36 and the decoders and driver 33 and 31 are supplied with a ground connection 37.

Having explained the operation of a simple logic circuit it will be understood that it may be driven by the matrix of keyboard switches shown in FIG. 5 such as a logic circuit for a calculator or other hand held instruments. The novel keyboard may be used for very large matrix of switches such as those employed with computers and other complex electronic devices.

Refer now to FIG. 7 showing a modified form of the switch shown in FIG. 1. The pressure sensitive switch 38 comprises a pair of electrically conductive pads 40 and 41 mounted on an insulating printed circuit board 42. A half inch rectangular piece of VELOSTAT (TM) foam 43 approximately ¼" thick was applied over the conductive pads 40 and 41. A piece of electrically conductive sheet 44 and a push-button pad 45 were applied over the electric conductive-resistive material 43. A predetermined pressure was applied at the push-button area 45. The resistance of the material 43 was sensed by leads 46 and 47 connected to a resistance meter or ohm meter 48. A table of pressure applied vs. resistance sensed for the VELOSTAT (TM) foam 43 is shown in table FIG. 8. It will be noted that when no pressure is applied the resistance is shown as 2 meg ohms which is the equivalent of an open circuit. However, when a pressure of only one pound is applied the resistance drops to 2,000 ohms. This is a relatively large area of conductive-resistive material and switches made with smaller areas of the same material require less pressure to reduce the distance sensed even below 2,000 ohms.

Refer now to FIG. 9 showing a modified embodiment switch 50 which may be used as a foot-pedal switch. The switch element is encapsulated in a compressible foam 51 and comprises a pair of conductive pads 52 and 53 separated from each other by a piece of conductive-resistive material 54. The change in resistant sensed on leads 55 and 56 may be sensed at sensor logic 57 so as to control the voltage on line 58 by means of a variable resistor 59 or a silicon control rectifier (SCR) not shown. The control of the variable resistor 59 is capable of controlling a load such as a small motor 60.

Refer now to FIG. 10 which shows a table of resistance vs. pressure for a 4 cm square area of the aforementioned VELOSTAT (TM) film 4 mils thick. The table of FIG. 10 was prepared by measuring the resistance of a square 2 cm long on each side of the conductive-resistive film which was mounted between two conductive plates as calibrated weights stacked thereon. This table is designed to show that when the pressure applied is distributed over a large area that the resistance is much higher than the pressure employed on a small push-button acting on a discrete area as shown in FIGS. 1 to 5. The calibrated resistances can be recorded as digital data in ROM type memory. Such data can be used as an address or as an indication of displacement or pressure applied.

Refer now to FIG. 11 showing a matrix of first and second conductive pads 61 and 62. When the matrix of FIG. 11 is incorporated into the keyboard switch array of the type shown in FIG. 5 only eight output lines 63 are required for indicating which of the 16 switches in the array has been activated. It will be understood that when any one of the pairs of conductive pads 61 and 62 is activated, the resistance across the gap is substantially reduced and two of the lines 63 will indicate that the unique pair of discrete pads has been activated thus, reducing the number of leads 30 shown in FIG. 5 required to provide a matrix of switches. It will be appreciated that when a very large number of such switches are incorporated into the keyboard that fewer lines will be required. The decoders of the type which may be employed with the matrix switches shown in FIG. 11 are well known and do not require explanation herein.

Having explained a preferred embodiment switch and preferred embodiment matrix of switches it will be understood that the structure is extremely simple and provides means for producing a very low cost keyboard which is extremely reliable and durable. The structure incorporates a plurality of flat sheets which may be stamped out and printed and then laminated together to provide the keyboard shown in FIG. 5. It will be appreciated that this keyboard is extremely thin and can be embodied in a form less than ¼" thick such as would be used for pocket calculators and appliances. The variable resistance structures do not require moving contacts which would wear out. Since the sheets forming the switch element may be laminated and encapsulated there is no corrosion problem with contacts as has occurred with such switches in the prior art. It will be appreciated that the switch structure provided herein does not have contacts and therefore does not produce contact bounce as occurs with some switches in the prior art. It is known that switches may be incorporated with electronic latches and light indicating devices so that a very light touch of a switch may be indicated visually and latched to prevent duplication of operation of the switch during extremely fast operation as occurs in switches used in the telephone industry.

In addition to using plastics in sheet, foam or sponge form, it was discovered that layers of paper such as toweling impregnated with carbon displayed characteristics of the compressive-resistive material which may be used in the switch devices explained hereinbefore.

I claim:

1. A pressure sensitive matrix switch device comprising:
   an insulative base,
   a first conductive pad means having a plurality of switch pads,
   a second conductive pad means,
   at least one of said pads being mounted on said base,
   a pressure sensitive conductive-resistive material intermediate said conductive pad means,
   said conductive-resistive material normally displaying a very high resistance therebetween when no pressure is applied,
   said conductive-resistive material displaying a low resistance therebetween when a light pressure is applied,
   means for applying pressure to said conductive pads to compress said conductive-resistive material and to change the resistance of said conductive-resistive material from a relatively high ohmic value to a relatively low ohmic value,
   voltage source means connected to the said second conductive pad means,
   said change of said conductive-resistive material from a relatively high ohmic value to a relatively low ohmic value for generating a voltage signal from one of said switch pads indicative of a particular switch device being operated, and
   logic encoder means coupled to said voltage signal for generating binary coded signals indicative of one of said matrix switch devices being operated.

2. A pressure sensitive matrix switch device as set forth in claim 1 wherein said means for applying pressure to said conductive-resistive material comprises a plurality of insulative push-buttons mounted on a continuous insulative sheet,
   said second conductive pad means further comprises a continuous flexible conductive sheet underlying said insulative push-buttons, and
   individual leads connected to each of said first conductive switch pads for coupling said voltage signal to said logic encoder means.

3. A pressure sensitive matrix switch as set forth in claim 2 wherein said push-buttons comprise indicia printed on said continuous insulative sheet.

4. A pressure sensitive switch device as set forth in claim 2 wherein said conductive-resistive material further comprises a continuous sheet of sponge-like material intermediate said first and said second conductive pad means.

5. A pressure sensitive matrix switch device as set forth in claim 1 wherein said second conductive pad means further comprises,
   a continuous flexible separate conductive sheet underlying said push-buttons and overlaying said pressure sensitive conductive-resistive material, and
   said switch pads underlying said pressure sensitive conductive-resistive material and overlaying said insulated base.

6. A pressure sensitive matrix switch device as set forth in claim 5 wherein said conductive-resistive material further comprises a continuous thin sheet of solid carbon impregnated plastic sheet material intermediate said first and said second conductor pad means.

* * * * *